United States Patent [19]

Peterson

[11] 4,064,419
[45] Dec. 20, 1977

[54] SYNCHRONOUS MOTOR KVAR REGULATION SYSTEM

[75] Inventor: Robert S. Peterson, Williamsville, N.Y.

[73] Assignee: Westinghouse Electric Corporation, Pittsburgh, Pa.

[21] Appl. No.: 730,889

[22] Filed: Oct. 8, 1976

[51] Int. Cl.² ............................................. H02P 7/36
[52] U.S. Cl. ..................................... 318/179; 323/117
[58] Field of Search ............... 318/179, 174, 178, 438; 323/117, 102, 108, 119

[56] References Cited

U.S. PATENT DOCUMENTS

| | | | |
|---|---|---|---|
| 2,925,550 | 2/1960 | Hotson | 323/117 |
| 3,383,575 | 5/1968 | Bobo | 318/179 |
| 3,686,551 | 8/1972 | Peterson | 318/179 |

Primary Examiner—Herman J. Hohauser
Attorney, Agent, or Firm—J. J. Wood

[57] ABSTRACT

This disclosure relates to a synchronous motor KVAR regulation system which utilizes a synchronous motor connected to a power distributor line to generate corrective (capacitive) KVARS to automatically follow and compensate for KVARS being generated by the other loads on the distribution line. The system takes into consideration the thermal capacity (motor rated current) of the synchronous motor so that the KVAR regulation system is not permitted to overexcite the synchronous motor for long periods of time. The KVAR regulation system also programs a minimum motor field current with respect to the motor load so as to insure that the synchronous motor will not pull out of synchronism during peak loads.

2 Claims, 14 Drawing Figures

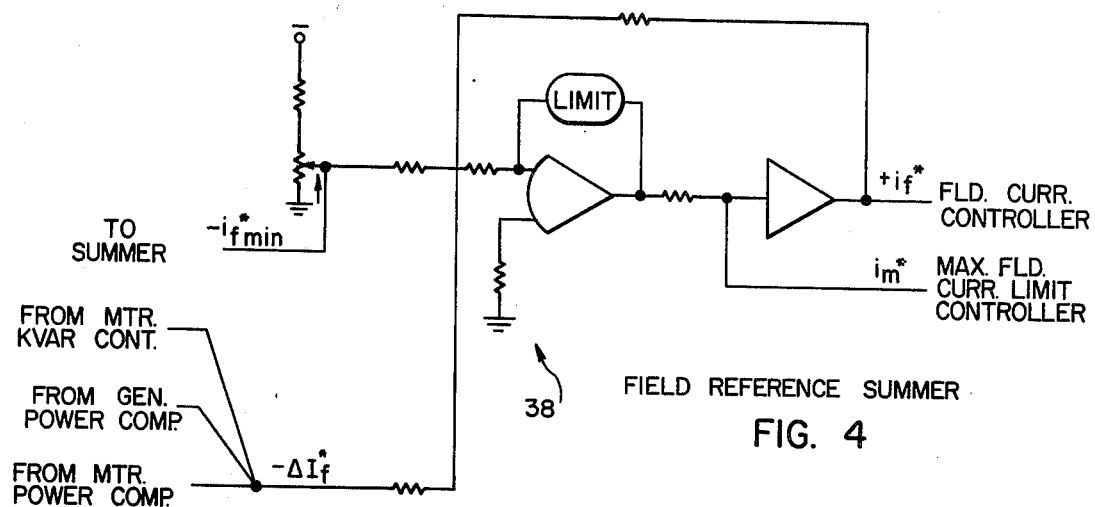
FIG. 4 FIELD REFERENCE SUMMER
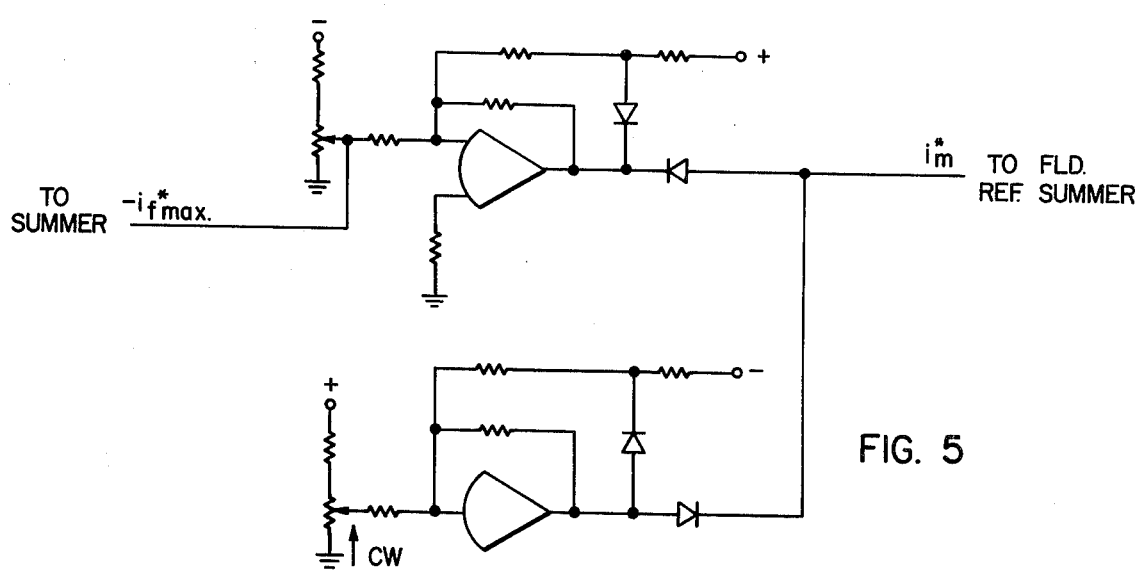
FIG. 5 MAXIMUM FIELD CURRENT REFERENCE LIMIT CONTROLLER
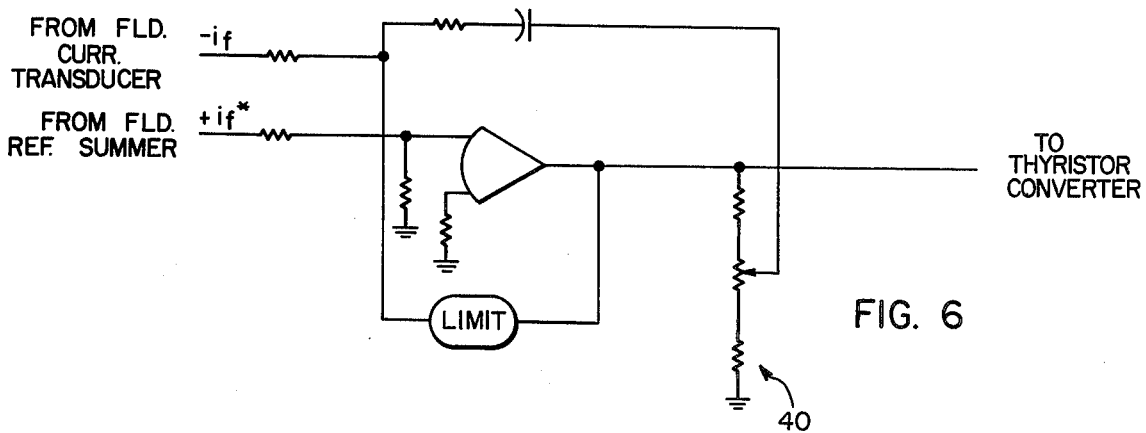
FIG. 6 FIELD CURRENT CONTROLLER

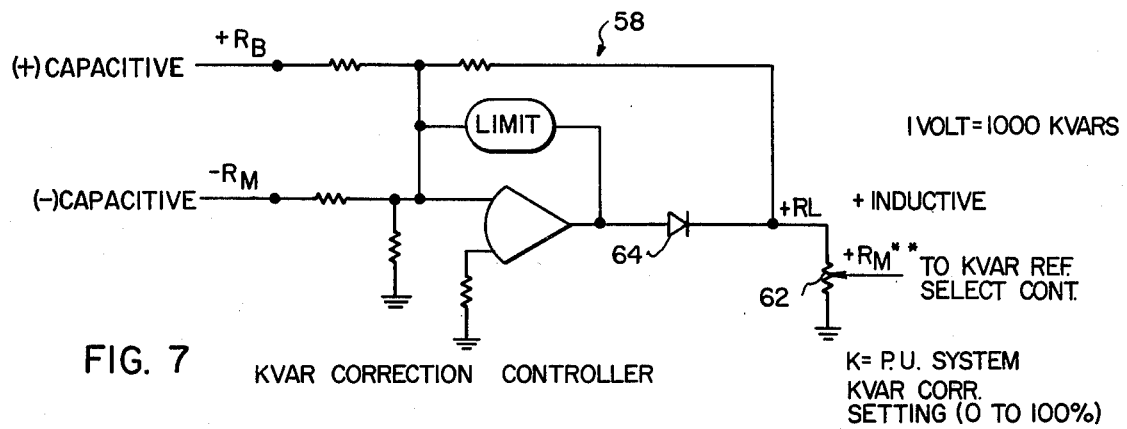
FIG. 7 KVAR CORRECTION CONTROLLER
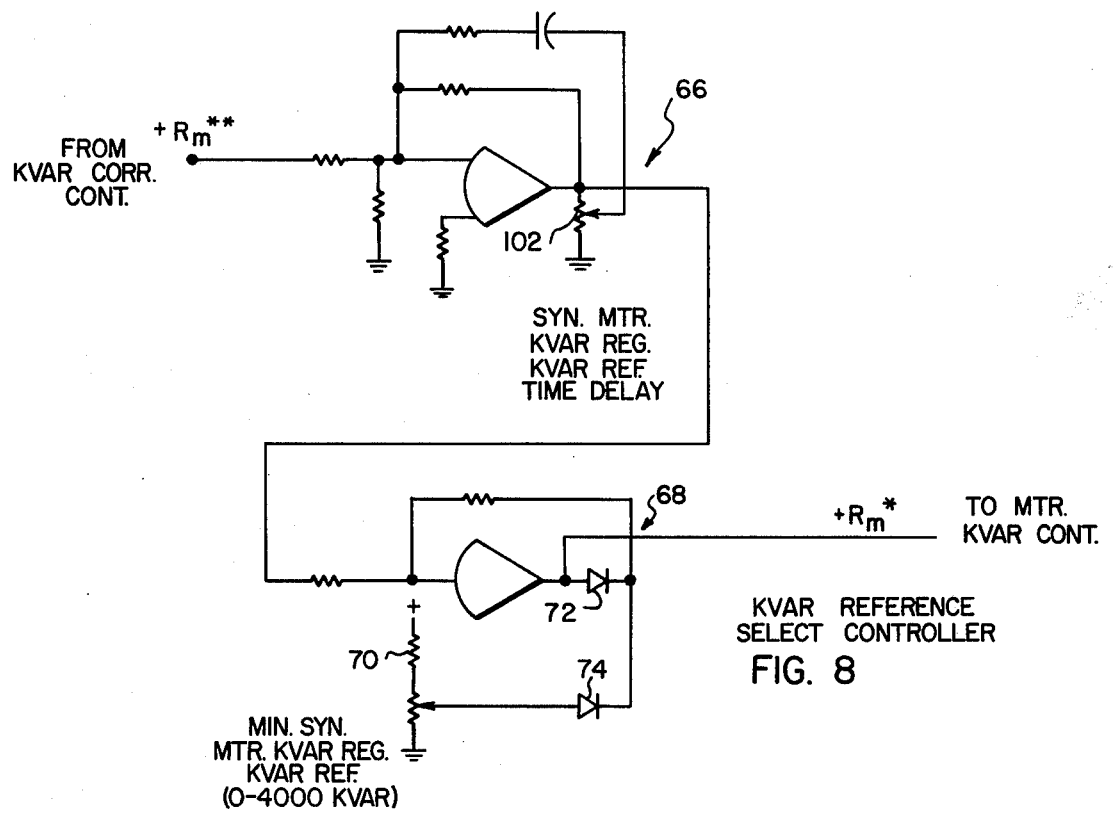
FIG. 8 KVAR REFERENCE SELECT CONTROLLER
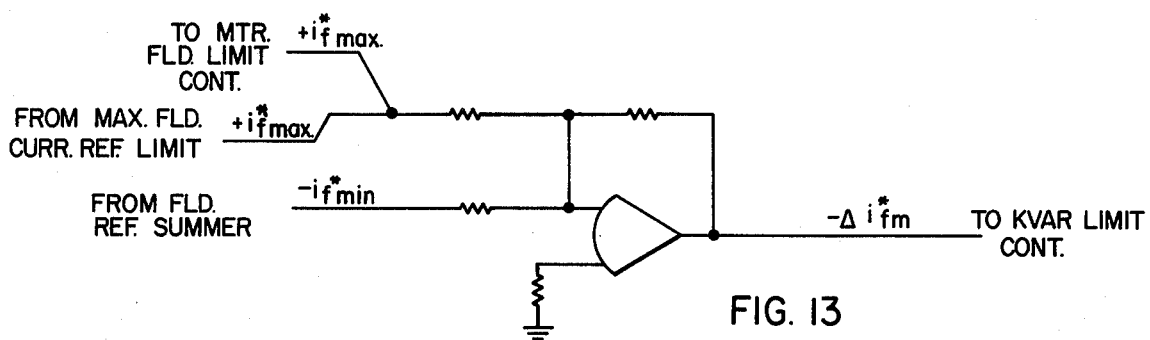
FIG. 13

MOTOR KVAR CONTROLLER

MOTOR FIELD TEMPERATURE CONTROLLER

MOTOR FIELD TEMPERATURE LIMIT CONTROLLER

KVAR LIMIT CONTROLLER

SYNCHRONOUS MOTOR KVAR REGULATION SYSTEM

BACKGROUND OF THE INVENTION

1. Field of the Invention:

This invention relates to a synchronous KVAR regulation system connected to a power distribution line to generate capacitive KVARS to automatically follow and compensate for the inductive KVARS being generated by other loads on the distribution line.

2. Description of the Prior Art

In many industrial applications, a serious problem is the a.c. power line variations during normal manufacturing operations which are the result of fluctuating demands. These system line voltage swings are the result of variations in both real and reactive power demands. The fluctuating real power demand results from energy expended during the manufacturing process and little can be done about it. The variation in KVAR (reactive power) demand can however be compensated for, at least in part. Additionally, many utilities bill the industrial customer based on both a 15 or 30 minute kilowatt demand during the month as well as on a maxiumum 15 or 30 minute KVAR demand. Obviously anything the customer can do to improve the KVAR demand will lower the cost of energy.

In most applications, the industrial loads create lagging (inductive) demands. It is known in the art that an overexcited synchronous motor will generate corrective (capacitive) KVARS to compensate for the lagging KVARS. The use of the synchronous motor to improve line voltage and power factor is discussed at length in a paper "Use of Synchronous Motor Drives for Maintaining Distribution System Line Voltage and Power Factor" by Robert S. Peterson IEEE Transitions on Industry and General Applications Vol. IGA-7, No. 6, November/December 1971.

The present invention provides a synchronous motor KVAR regulation system utilizing a synchronous motor to provide corrective (capacitive) KVARS while at the same time providing for thermal and synchronization protection.

SUMMARY OF THE INVENTION

A system is claimed for regulating the inductive KVARS demanded by a power distribution line in which a synchronous motor is connected to the distribution line for the purpose of generating compensating (capacitive) KILOVARS. Means are coupled to the power distribution line for deriving a signal which is a function of the inductive KILOVARS demanded by other loads on the line. A KVAR controller means receives the derivative inductive KVAR signal and delivers a compensating (capacitive) KVAR signal to a field current control loop connected to the field winding of the synchronous motor. Field current thermal control means coupled to the field current control loop, receives a maximum field current signal and delivers a limit signal to the KVAR controller means to inhibit the output of the KVAR controller means when the average field current exceeds the maxium field current signal. A torque compensating means is coupled to the armature of said synchronous motor and is connected to deliver a minimum field current to the field current control loop to insure that the synchronous motor will remain in synchronism during normal peak loads, in the order of priority: (1) synchronous control, (2) field control and (3) capacitance KVAR control.

BRIEF DESCRIPTION OF THE DRAWINGS

FIG. 4 is an electrical schematic of the field reference summer;

FIG. 5 is an electrical schematic of the maximum field current reference limit controller;

FIG. 6 is an electrical schematic of the field current controller;

FIG. 7 is an electrical schematic of the KVAR correction controller;

FIG. 8 is an electrical schematic of the KVAR reference select controller;

FIG. 13 is an electrical schematic of the summer 90 which is a part of the KVAR limit controller, and FIG. 14 is a diagram depicting the meaning of the symbols used for the various function blocks.

BRIEF DESCRIPTION OF A PREFERRED EMBODIMENT

Figure 1:
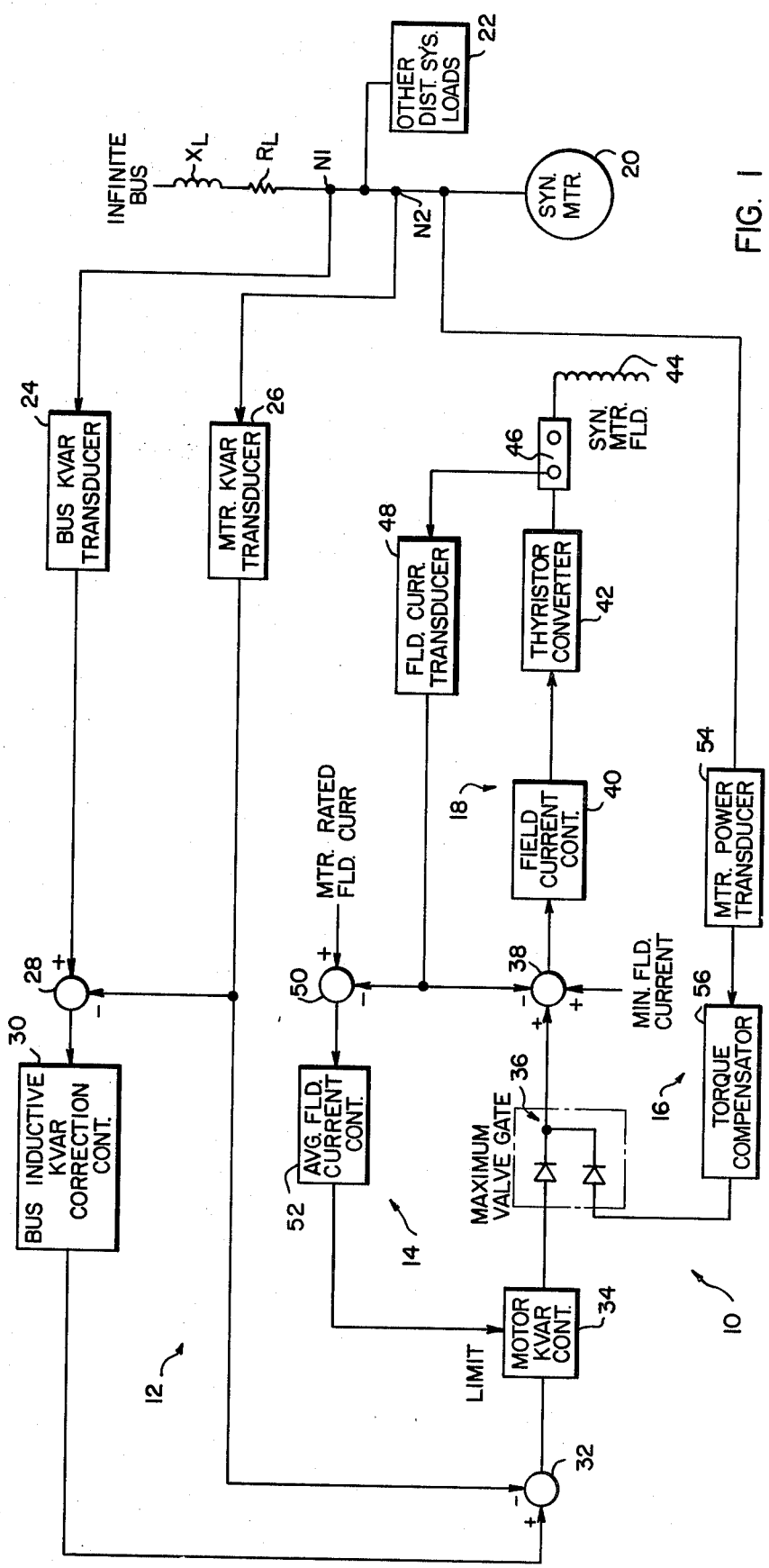
FIG. 1 is a simplified block diagram depicting the synchronous motor KVAR regulation system in accordance with the invention.

Referring now to FIG. 1, the synchronized motor KVAR regulation system, identified generally at 10 comprises a plurality of four loops: the synchronized motor KVAR control loop 12; the rated motor field current control loop 14; the synchronization control loop 16; and the field current control loop 18.

A synchronous motor 20 is connected to an infinite bus. The term "infinite bus" merely connotes that the capacity of the electrical utility energy to the plant is so large vis-a-vis the electrical requirements of the plant as a whole, that the voltage supply to the plant does not change appreciably with the widely varying electrical demands of the manufacturing process. The various distribution system loads of the plant are indicated symbolically at 22.

The total KVARS measured at node $N_1$ are sent to bus KVAR transducer 24. The synchronous motor KVARS (node $N_2$) are measured by motor KVAR transducer 26. The outputs of transducers 24, 26 are applied to summation point 28, and the resulting algebraic summed output is applied to bus indicative KVAR correction controller 30. The outputs from the motor KVAR transducer 26 and bus inductive KVAR correction 30 are applied to summation point 32. A motor KVAR controller 34 receives the summed output from summation point 32 and applies its output to a maximum value selection gate indicated symbolically at 36. The selected output from gate 36 is applied to summation point 38. Another input to the summation point 38 is a minimum field current signal. The algebraic summed output from summation point 38 is applied to a field current controller 40, the output of which is applied to a thyristor converter 42 which controls the current to field windings 44 of the synchronous motor 20. A shunt 46 in the synchronous motor field 44 provides a field current control signal which is applied to a field current transducer 48. The output of transducer 48 is applied to: (a) a summmation point 50, and (b) the summation point 38. The summation point 50 also receives an analog signal which is a function of motor rated field current. From the summation point 50 the signal path is to an average field current controller 52 the output of which applies a limit signal to the motor KVAR controller 34. A motor power transducer 54 connected to the armature of the synchronous motor 20 delivers a signal to the torque compensator 56, the output of which is applied as another input to the maximum value selection gate 36.

DESCRIPTION OF OVERALL OPERATION

Before describing the synchronous motor KVAR regulation system in greater detail, it will be helpful to obtain an overview of the operation.

The system line swings are the result of changes in power demand (real power) or in KILOVAR demand (reactive power). In the practical industrial environment the reactive power demand results in inductive or lagging KILOVARS. The situation can be improved if corrective or capacitive KILOVARS are generated to reduce the inductive KILOVARS.

As is well known, an overexcited synchronous motor will provide capacitive KILOVARS i.e., the current leads the terminal voltage.

In contemplation of the invention, the inductive KILOVARS of the other distribution system loads 22 are measured, and then the synchronous motor 22 generates corrective (capacitive) KILOVARS. Theoretically, all the inductive KILOVARS could be neutralized or compensated for, but that would require rather large synchronous motor which may not be economically feasible. Therefore, as will be explained, the synchronized motor will only compensate for a fixed percentage of the inductive KILOVARS.

The synchronous motor 20 cannot be overexcited for too long a time otherwise the field winding would be overheated and the overall life of the motor shortened. Provision is therefore made to insure compliance with the rated field current specified by the manufacturer of the synchronous motor.

Additionally, under normal peak loads, it is undesirable to permit the motor to go out of synchronism, so provision is made to insure that the synchronous motor will remain in synchronism under these conditions.

These desiderata are realized with the following order of priority:
  a. synchronization control i.e., produce enough field current so that the motor 20 does not go out of synchronism under normal peak loads;
  b. thermal control i.e., do not permit the motor KVAR controller 34 to signal an average field current which is greater than the motor rated field current; and
  c. capacitive KVAR control to neutralize the inductive KVARS.

Referring back again to FIG. 1, the inductive KVARS of load 22 are measured in any convenient manner, usually it is a question of convenience.

The KVAR transducers 24, 26 are each a HALLTIPLIER (trade mark) of the type manufactured by Scientific Columbus, Inc., of Columbus, Ohio. It produces an analog output which is a function of the KILOVARS being supplied at the point of measurement.

The transducer 24 measures the total KVARS of the system, while transducer 26 measures KVARS of the motor 20. At the summation point 28, the motor KVARS are subtracted from the total KVARS, the result being a signal which is a function of the KVARS of the other distribution system loads 22. This signal is sent to the bus inductive KVAR correction circuit 30; this latter circuit selects a portion of the inductive KVAR signal for neutralization by the capacitance KVARS generated by the synchronous motor 20. Note: If for some reason the total KVARS are capacitive, the output of bus inductive KVAR correction circuit 30 is zero. At summation point 32, the inductive KVAR signal (+) is algebraically added to the capacitive signal (−) from the motor KVAR transducer. The motor KVAR controller 34 then develops a signal which will overexcite the field 44 of the motor 20 to generate the required capacitive KVARS. However the rated motor field current control loop 14 provides a limit on the field current so that the controller 34 does not signal for an average field current which is greater than the rated (nameplate) field current of the synchronous motor 20. The thermal control feature is described in U.S. Pat. No. 3,686,552 for "Synchronous Motor Field Regulator Control" invented by Robert S. Peterson and assigned to the same assignee as the present invention.

As may be seen from a study of the block diagram of FIG. 1, the maximum valve selection gate has two inputs and it selects the one having the greater magnitude. The synchronization control loop 16 supplies a positive signal to the maximum value selection gate 36 which is a minimum value to maintain the motor 20 in synchronism under normal peak load conditions. The operation of the synchronization control loop 16 is described in U.S. Pat. No. 3,686,551 for "Synchronous Motor Field Regulator Control" invented by Robert S. Peterson and assigned to the same assignee as the instant invention.

Finally the loop 18 is a closed loop for summarizing the instantaneous field current with the KVAR correction signal called for by the motor KVAR controller 34, against the minimum requirements of loop 16; the loop also supplies a negative signal for addition wih the rated motor field current signal to achieve thermal control by means of rated motor field current control loop 14.

DETAILED DESCRIPTION OF PREFERRED EMBODIMENT

Figure 2:
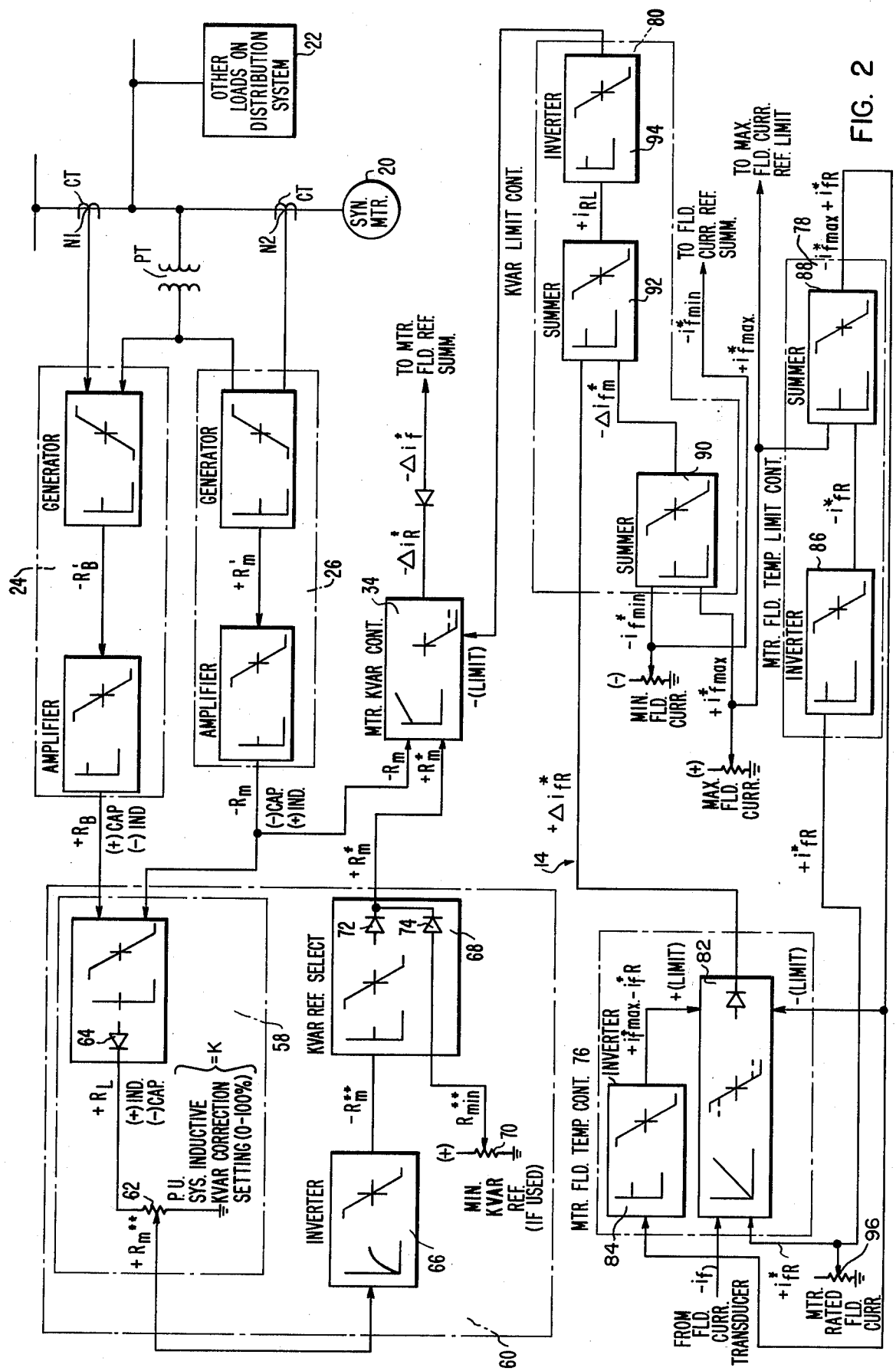
FIG. 2 is a block schematic design, showing the motor KVAR control loop and the motor rated field current control loop.
Figure 3:
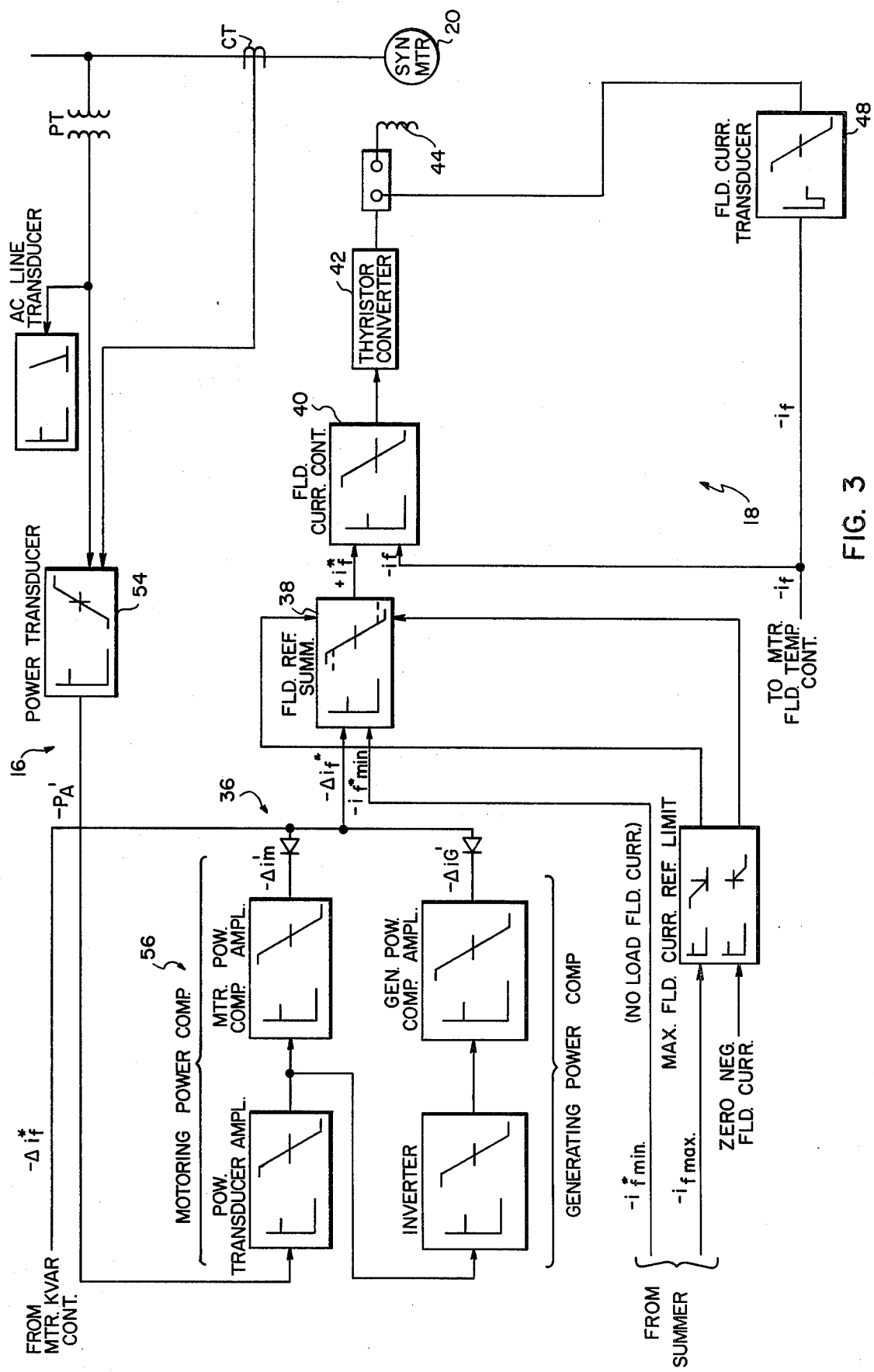
FIG. 3 is a block schematic diagram showing the synchronization control loop.

In FIGS. 2 and 3 there are shown in greater specificity the principal components of the loops 12, 14 16 and 18 identified in FIG. 1. (The meaning of the graphic symbols within the various boxes may be understood by referring to FIG. 14).

First considering FIG. 2, the current transformers (CT) and the potential transformers (PT) derive the current and voltage signals from nodes $N_1$ and $N_2$ and send them to generators within the transducers 24 and 26 to derive signals $-R_B'$ and $+R_m'$ respectively. The latter signals are then amplified and become $+R_B$, $-R_m$ respectively and are applied to the bus inductive KVAR correction controller 30.

Within the bus inductive KVAR correction controller 30 are two principal circuits: the KVAR correction controller 58 and the KVAR reference select controller 60. The controllers 58 and 60 are depicted in greater detail in FIGS. 7 and 8, respectively. The output *$R_L$ represents the KVARS of other loads in the distribution system (FIGS. 1, 2:22). As previously explained it would be theoretically possible to correct 100% for the inductive KVARS, but as a practical matter this may not be economically feasible because of the large capacity required for the synchronous motor 20. Accordingly, compensation is made for only a fraction of the inductive KVARS (load 22) and is physically realized by the gain setting K which is represented by the selected portion of the potentiometer 62.

The mathematical rationale for the gain K will now be discussed in some detail. The loop gain K between calculated other load bus inductive KVARS and the synchronous motor KVAR reference determines the percent of the inductive KVARS generated by the other loads on the bus for which the synchronous motor KVAR regulator will provide compensation.

Syn. Mtr. Cap. KVAR Ref. = (Total Bus Ind.
KVARS Measured + Syn. Mtr. Cap KVARS) K (1)

Assume that the synchronous motor capacitive KVARS matches the synchronous motor KVAR reference.

Syn. Mtr. Cap. KVAR Ref. = Syn. Mtr. Cap. KVAR (2)

Total Bus Ind. KVARS Measured = Bus Ind.
KVARS by Other Bus Loads − Syn. Mtr. Cap.
KVARS (3)

Therefore, by substituting equations (2) and (3) into equation (1),

Syn. Mtr. Cap. KVARS = (Bus Ind. KVARS by
Other Bus Loads - Syn. Mtr. Cap. KVARS + Syn.
Mtr. Cap. KVARS) K (4)

or

Syn. Mtr. Cap. KVARS=K (Bus Ind. KVARS by Other Loads), (5)

where the gain K is the per unit inductive KVARS of the other load on the bus compensated by the synchronous motor.
Therefore, Percent Ind. KVARS of the Other Load on Bus
Comp. by Syn. Mtr. KVAR Reg. = 100K (6)

If K = 1, the synchronous motor will compensate for all the bus inductive KVAR load and the bus power factor will be 100% providing no synchronous motor KVAR regulator limits such as maximum or minimum motor field current, motor thermal capacity, are not exceeded.

As will be observed in FIG. 7, if for any reason the other loads 22, become capacitive (RB(+) capacitive) diode 64 would be back biased and no signal would be sent to the motor KVAR controller 34.

In FIG. 8 which depicts the KVAR reference select controller 60, the operational amplifier indicated generally at 66 serves an inverter, and the operational amplifier circuit indicated generally at 68 is the KVAR reference select circuit. By means of potentiometer 70, a minimum reference signal may be programmed so that even if the other load on the distribution system 22 is capacitive, the synchronous motor KVAR control loop will still regulate for minimum capacitive KVARS, provided the motor torque compensation loop 16 does not override. When the corrective capacitance KVARS generated follow a cyclic pattern and the system signals for high corrective KVARS over a long period of time, the synchronous motor 20 can be thermally overloaded. A synchronous motor is designed for a finite thermal capacity and when this is exceeded perhaps as a result of experiencing a high line current and/or field current for a long period of time, then the motor life will be shortened. Under severe overload conditions the motor can be damaged very quickly.

Figure 10:
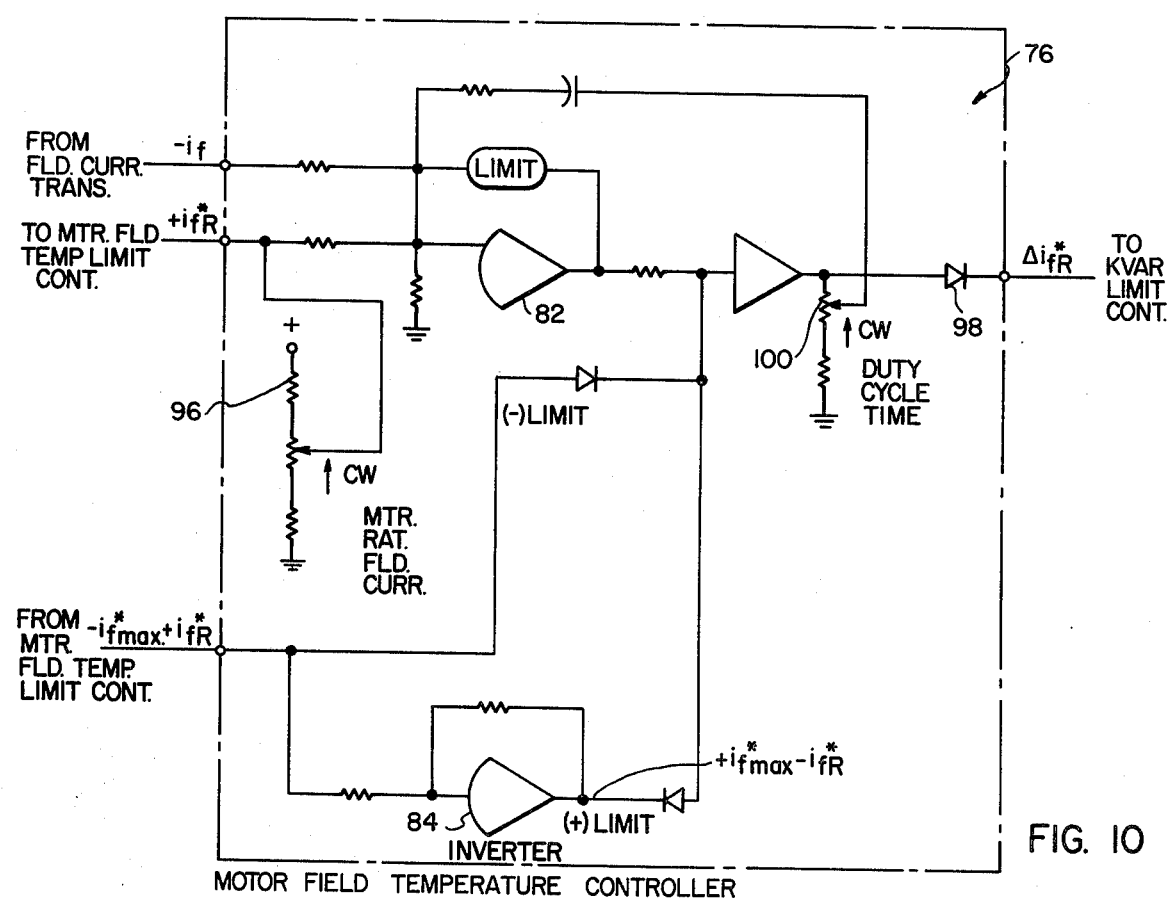
FIG. 10 is an electrical schematic of the motor field temperature controller.
Figure 11:
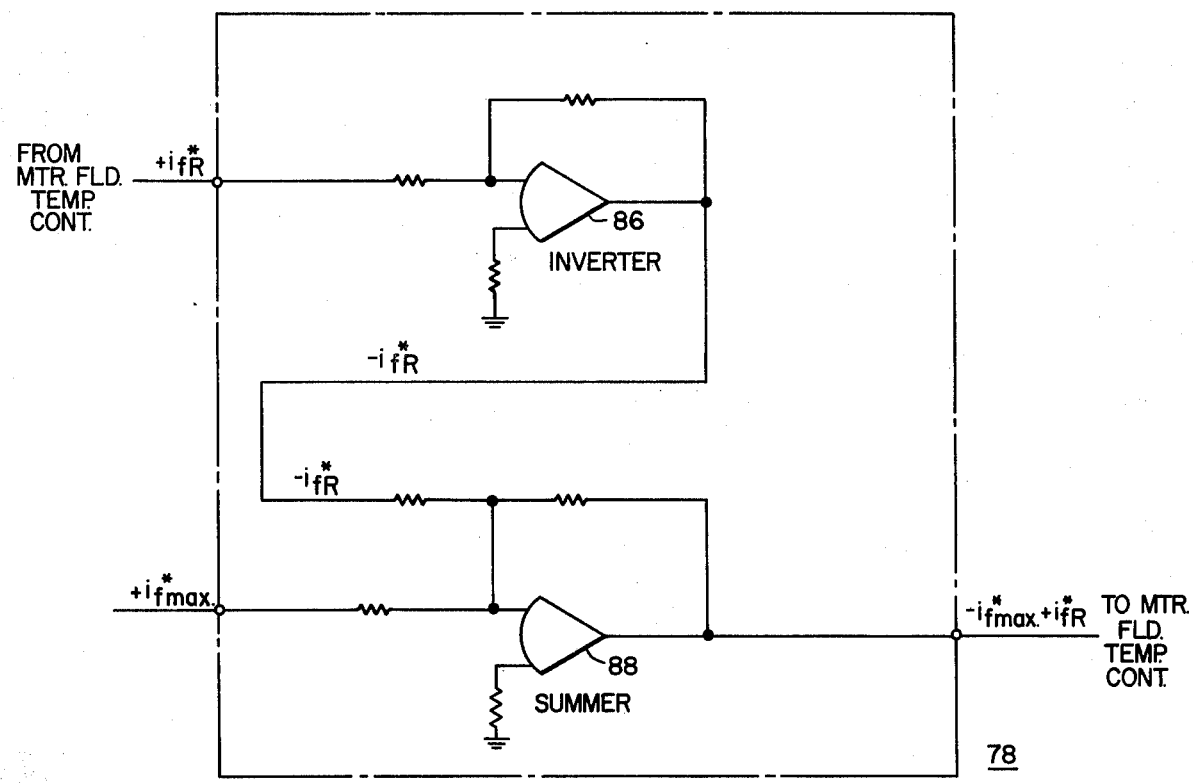
FIG. 11 is an electrical schematic of the motor field temperature limit controller.
Figure 12:
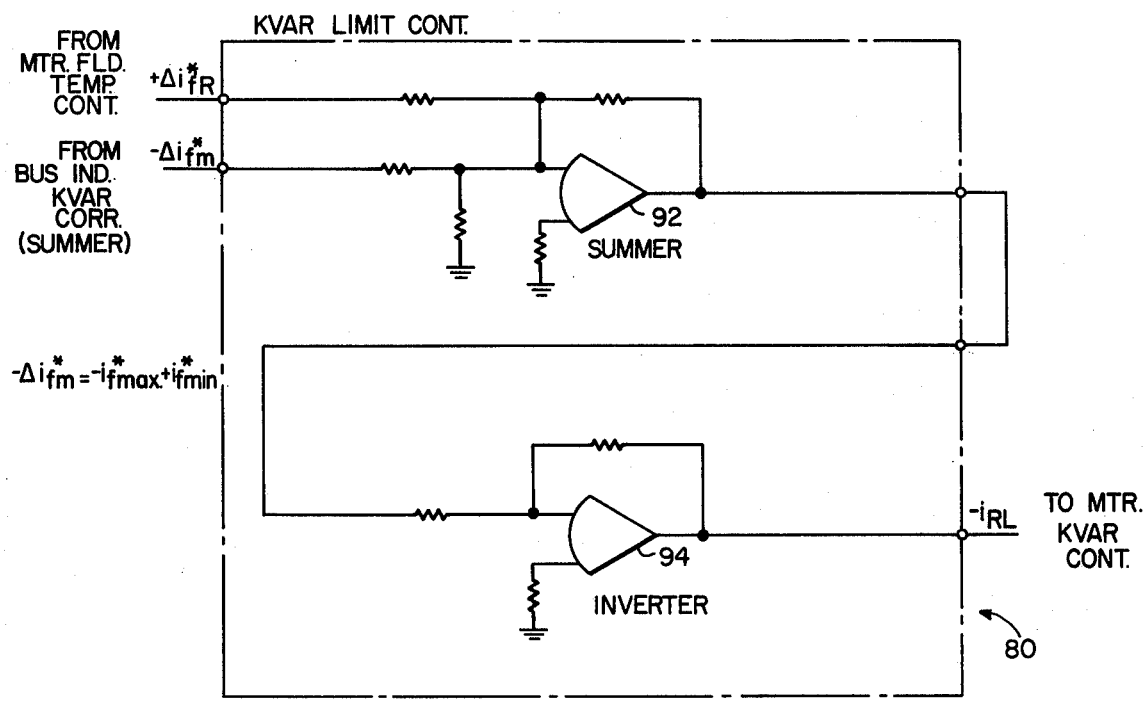
FIG. 12 is an electrical schematic of the KVAR limit controller.

The average field current control 52 comprises motor field temperature controller 76, motor field temperature limit controller 78, and KVAR limit controller 80. The motor field temperature controller field temperature control operational amplifier 82 and inverter 84. The motor field temperature limit controller 78 comprises inverter 86 and summer 88. The KVAR limit controller 80 comprises summer 90, summer 92 and inverter 94. For ready reference, the details of these components are depicted in the following figures:

FIG. 10 — motor field temperature controller 76
FIG. 11 — motor field temperature limit controller 78
FIG. 12 — summer 92 inverter 94 of KVAR limit controller 80
FIG. 13 — summer 90 of KVAR limit controller 80

The motor field current $(-i_f)$ is derived from the field current transducer (FIG. 3:48) and applied to the field temperature control operating amplifier 82 (FIG. 10). The motor rated field current $+i_{fR}$ is set by potentiometer 96 (FIG. 10). The motor rated field current $+i_{fR}$ is also sent to the inverter 86 (FIG. 11) of the motor field temperature limit controller. The signal $-i^*_{fMAX} +i^*_{fR}$ is also applied to operational amplifier 82 and to inverter 84 from the motor field temperature limit controller 78 (FIG. 11).

The motor field temperature controller FIG. 10:76 is an integrator which compares the field current $-i_f$ with the rated motor field current $+i^*_{fR}$.

Figure 9:
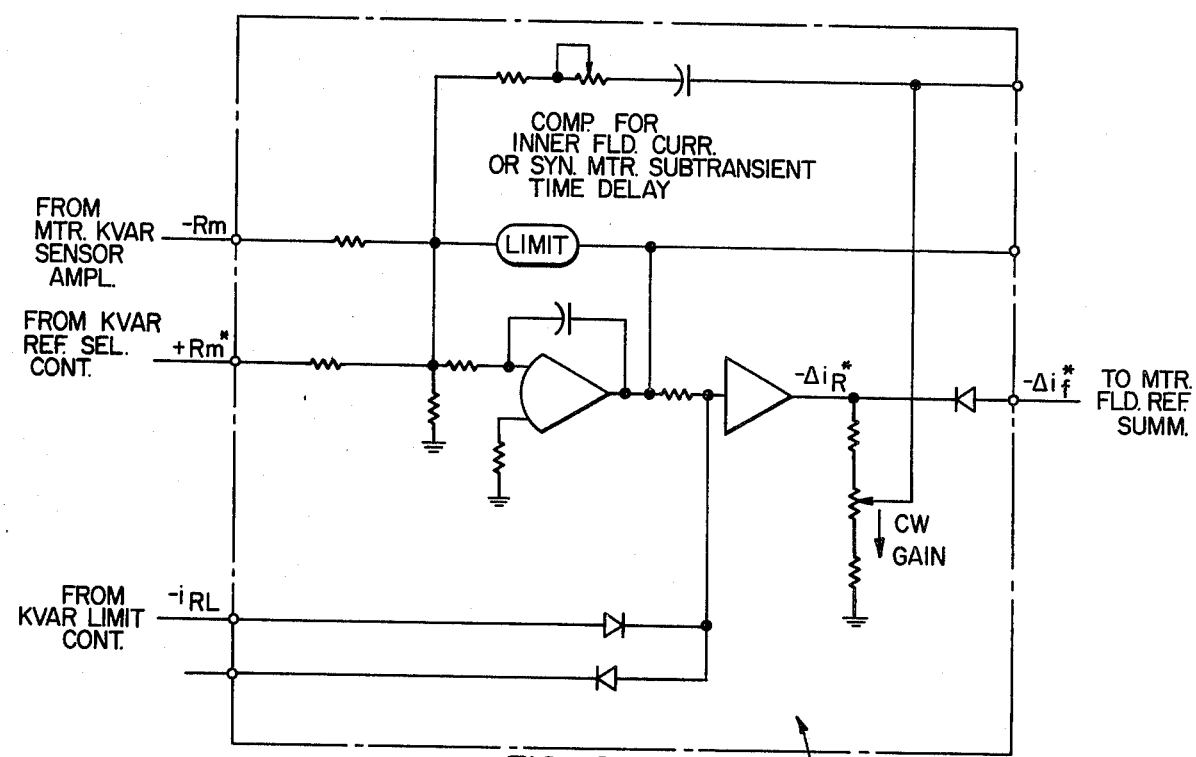
FIG. 9 is an electrical schematic of the motor KVAR controller.

If for some reason the average motor field current is greater than the motor rated field current $+i^*_{fR}$ over typically a 20 second period (which is adjustable), the field current that can be obtained by the motor KVAR controller FIG. 9:34 is set to rated field current $+i^*_{fR}$. If the average field current is lower than the rated field current $+i^*_{fR}$ the motor KVAR controller 34 can call for the maximum field current $i_{fMAX}$ which is approximately 150%. This feature is accomplished by changing the saturation limit $-i_{RL}$ of the motor KVAR controller 34 which sets the maximum field current the motor KVAR controller 34 can call for.

If the synchronous motor capacitive KVARS $(-R_m)$ is above the motor KVAR regulator reference signal $+R^*_m$, the output signal of the motor KVAR controller 34 will go to zero since it is not permitted to reduce the field current below the minimum field current setting $(-i_{fMIN})$.

Referring to FIG. 10, if the motor field current $-i_f$ is less than the rated field current $-i^*_{fR}$ over a period of time the operational amplifier 82 will be at − saturation voltage $(-^*_{fMAX} + ^*_{fR})$ and $\Delta i_{fR} = 0$ by reason of the blocking diode 98.

If over a period of time, the motor rated current $-i_f$ is greater than rated field current $+f^*_{fR}$, the motor field temperature controller 76 will be forced to + saturation voltage $\Delta i^*_{fR} = +i^*_{fMAX} - i^*_{fR}$. The time it takes the motor field temperature controller FIG. 10:76 to go from — saturation ($-$ LIMIT $= -i^*_{fMAX} - i^*_{fR}$) depends upon the integrating time constant. (This is determined by the setting of potentiometer 100). The larger the integrating time constant the longer the thermal duty time. When the motor field temperature controller output is at $(+)$ limit $$\Delta i^*_{fR} = i^*_{fMAX} - i^*_{fR} \tag{7}$$

the KVAR limit controller 80 output ($-$) limit ($-i_{RL}$) is calculated by the regulator (summers 90 and 92) and inverter 94 as follows:

$$-i_{RL} = \Delta i^*_{fm} + i^*_{fR} \tag{8}$$

where $$-\Delta i^*_{fm} = -i^*_{fMAX} + i^*_{fMIN} \tag{9}$$

and $$+\Delta i^*_{fR} = i^*_{fMAX} - i^*_{fR} \tag{10}$$

Therefore, substituting equations (9) and (10) into equation (8)

$$-i_{RL} = -i^*_{fMAX} + i^*_{fMIN} + i^*_{fR} = -i^*_{fR} + i^*_{fMIN} \tag{11}$$

which means for this condition that the motor KVAR controller 34 can only call for a maximum field current corresponding to rated field current $+i^*_{fR}$ since, $$\text{MAX. MTR. FLD. CURRENT} = -i^*_{RL} - i^*_{fMIN}$$
$$\text{and} \tag{12}$$

substituting equation (11) into equation (12)

$$\text{MAX. MTR. FLD. CURRENT} = -i^*_{fR} + i^*_{fMIN}$$
$$- i^*_{fMIN} = -i^*_{fR} \text{ (rated field current)} \tag{13}$$

The per unit distribution system inductive KVAR correction setting (FIG. 7:62) synchronous motor KVAR reference time delay (FIG. 8:102) and minimum motor KVAR reference setting (FIG. 8:82) are to be adjusted such that the synchronous motor oscillations when an impact load is applied to the motor are minimized and the motor KVAR controller 34 (is not at a saturation limit) is regulating motor KVARS most of the time (average motor field current is less than rated motor field current). If the motor KVAR controller 34 is operating most of the time at an output limit of motor rated field current 34, the motor KVAR controller 34 is not able to correct for distribution system cyclic peak inductive KVAR loads when the motor KVAR controller 34 is at a saturation limit. The motor KVAR controller must be able to call for a motor field current greater than rated motor field current to compensate for the extreme peak KVAR inductive loads on the distribution system. The per unit system inductive KVAR corrective setting (FIG. 7:62) should be set sufficiently low that the motor field temperature controller (FIG. 10:76) very seldom controls the saturation limit of the motor KVAR controller (maximum field current permitted). The motor field temperature controller should only control the maximum motor field current permitted (motor KVAR controller saturation limit) when the other distribution system inductive load is a severe peak for a long period of time.

The synchronous motor KVAR reference time delay (0 to 2.3 seconds) adjusted by potentiometer 102 (FIG. 8) is adjusted to minimize synchronous motor oscillations during motor impact loads and yet not cause the motor KVAR regulator reference to be so slow that the KVAR regulator cannot compensate for cyclic distribution system peak inductive KVAR loads. The adjustment of this KVAR regulator reference time delay may be a compromise.

Completing the description, the operational amplifier for completing the summation FIG. 1:38 is shown in FIG. 4. The maximum field current reference limit control is shown in FIG. 5. The field current controller FIG. 1:40 is shown in greater detail in FIG. 6. The motor KVAR controller FIG. 1:34 is shown in greater detail in FIG. 9.

I claim:
1. A system for regulating the inductive KVARS demanded by a power distribution line comprising:
   a. a synchronous motor connected to the power distribution line;
   b. a field current control loop connected to the field winding of said synchronous motor;
   c. means coupled to said power distribution line for deriving a signal which is a function of the inductive KVARS demanded by the other loads on said power distribution line;
   d. KVAR controller means for receiving said derivative inductive KVAR signal and for delivering a compensating KVAR signal to said field current control loop to overexcite said synchronous motor to deliver capacitive KVARS to said power distribution line;
   e. field current thermal control means coupled to said field current control loop, for receiving a maximum field current signal and for delivering a limit signal to said KVAR controller to inhibit the output signal for said KVAR controller when the average field current exceeds said maximum field current signal; and
   f. torque compensator means coupled to the armature of said synchronous motor and connected to deliver a minimum field current to said field current control loop to insure that the synchronous motor will remain in synchronism during normal peak loads, all in the order of priority: first, synchronism control, next, field thermal control, and finally, compensating KVAR control.

2. A KVAR regulating system according to claim 1 wherein said inductive driving means comprises bus KVAR transducer means, motor KVAR transducer means summation means, said bus KVAR transducer means being connected to said power distributor line to measure the total KVARS, said motor KVAR transducer means being connected to said motor to measure the motor KVARS, summation means algebraically adding said motor and bus KVARS to provide said derivative inductive KVARS signal.

* * * * *